US005646674A

United States Patent [19]

Bacon et al.

[11] Patent Number: 5,646,674

[45] Date of Patent: Jul. 8, 1997

[54] OPTICAL PRINT HEAD WITH FLEXURE MOUNTED OPTICAL DEVICE

[75] Inventors: Wesley H. Bacon; Kenneth L. Baker, both of Rochester; John R. Debesis, Penfield; Jeffrey P. Serbicki, Holley; James S. Newkirk, LeRoy, all of N.Y.

[73] Assignee: Eastman Kodak Company, Rochester, N.Y.

[21] Appl. No.: 235,627

[22] Filed: Apr. 29, 1994

[51] Int. Cl.$^6$ .......... G01D 15/14; G02B 27/00

[52] U.S. Cl. .......... 347/257; 347/242

[58] Field of Search .......... 347/242, 257; 359/820; 385/116, 119; 355/1, 202; 358/296

[56] References Cited

U.S. PATENT DOCUMENTS

| | | | |
|---|---|---|---|
| 4,723,833 | 2/1988 | Yamada | 359/820 |
| 4,763,975 | 8/1988 | Scifres et al. | 350/96.15 |
| 4,803,689 | 2/1989 | Shibonuma | 372/36 |
| 4,850,674 | 7/1989 | Hasselskog | 359/820 |
| 4,942,405 | 7/1990 | Dody et al. | 347/238 |
| 4,953,936 | 9/1990 | Regener et al. | 350/96.17 |
| 4,969,155 | 11/1990 | Kahan | 372/70 |
| 4,995,687 | 2/1991 | Nagai et al. | 385/91 |
| 5,099,488 | 3/1992 | Ahrabi et al. | 372/361 |
| 5,121,457 | 6/1992 | Foley et al. | 350/96.1 |
| 5,125,054 | 6/1992 | Ackley et al. | 385/49 |
| 5,140,607 | 8/1992 | Paiva | 372/70 |
| 5,168,401 | 12/1992 | Endriz | 359/625 |
| 5,181,214 | 1/1993 | Berger et al. | 372/34 |
| 5,185,835 | 2/1993 | Vial et al. | 385/49 |
| 5,229,879 | 7/1993 | Gen-ei | 359/344 |
| 5,245,481 | 9/1993 | Kaneko et al. | 347/257 |
| 5,267,077 | 11/1993 | Blonder | 359/280 |

*Primary Examiner*—Benjamin R. Fuller
*Assistant Examiner*—David Yockey
*Attorney, Agent, or Firm*—Milton S. Sales

[57] ABSTRACT

A laser print head structure includes a laser diode array (14) coupled to a heat sink (10). A cylindrical lens element (20) is aligned with the laser diode array and bonded to the heat sink. A binary optical element (22) is then aligned with the cylindrical lens element and attached to the heat sink through the use of flexures (24). The use of the flexures permits the binary optical element to "float" in the plane of the laser diode array, thereby maintaining alignment even when the thermal expansion characteristics of the binary optical element are different from the thermal expansion characteristics of the heat sink. Anti-wicking slots (18) are provided in the heat sink at locations between the bonding points of the cylindrical lens element and the laser diode array. The anti-wicking slots, through capillary action, prevent excess adhesive from wicking along the cylindrical lens element and onto the facets of the lasers in the laser diode array. In addition, the flexures are provided with holes (28) to permit light to pass through the flexures to a light curable resin which is used to bond the flexures to the heat sink.

9 Claims, 1 Drawing Sheet

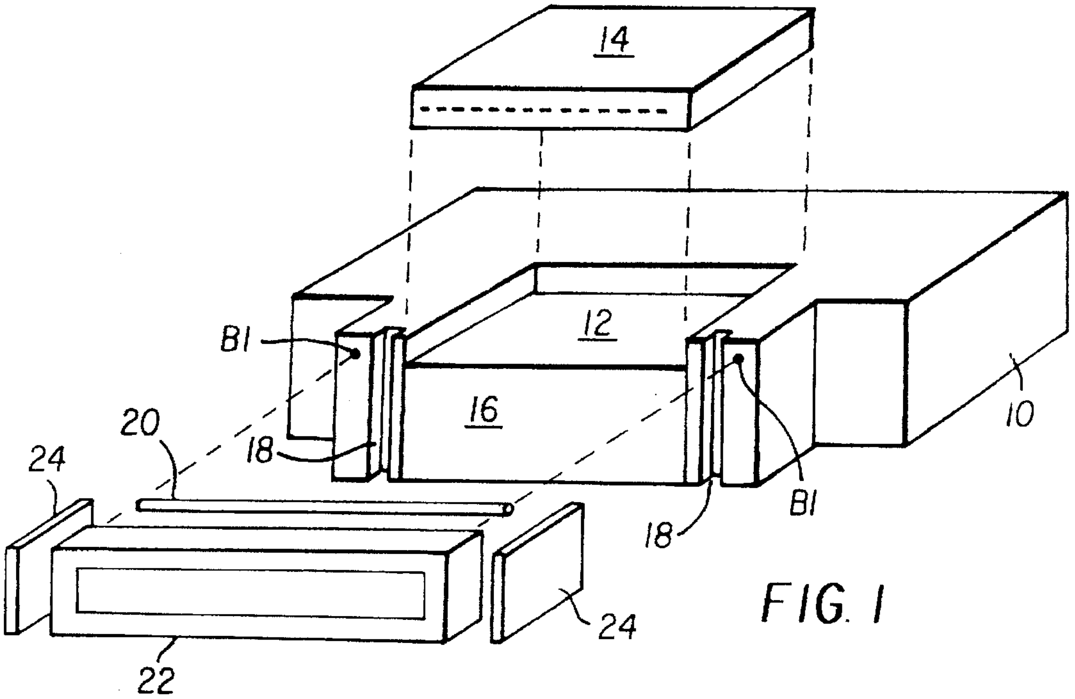
FIG. 1
FIG. 2
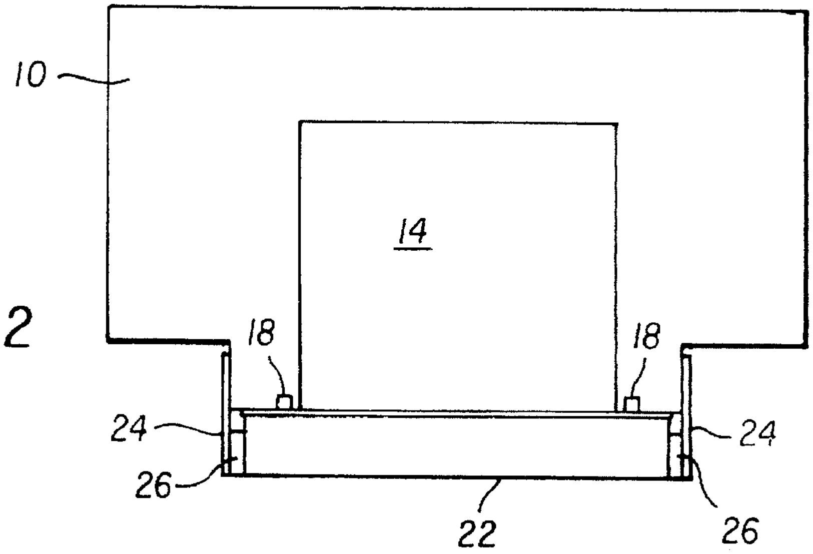
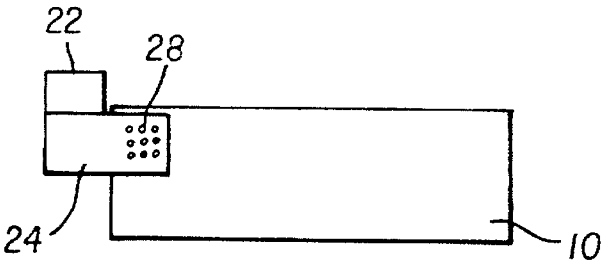
FIG. 3

OPTICAL PRINT HEAD WITH FLEXURE MOUNTED OPTICAL DEVICE

FIELD OF THE INVENTION

The invention relates in general to optical print heads that utilize a laser source to generate a write beam. More specifically, the invention relates to providing a print head structure that compensates for thermal expansion to maintain the elements in precise alignment with the laser source.

BACKGROUND OF THE INVENTION

Laser diode arrays have traditionally been used to supply power in applications such as pumping another laser. More recently, laser diode arrays have been utilized in optical print heads. U.S. Pat. No. 4,897,671, for example, describes that attachment of a waveguide to a laser diode array in a print head. The function of the waveguide is to provide a predetermined output spacing from the output end of the channel waveguides.

It is desirable to construct an optical print head utilizing a laser source, such as a laser diode array, that incorporates optical elements to transmit and focus the light emitted from the array onto a print surface. The alignment of the optical elements in such a print head is extremely critical, on the order of tenths of a micron, and can be easily altered by small dimensional variations caused by the thermal expansion or contraction of various components or shrinkage in adhesives used to bond the components. It is therefore an object of the invention to provide an optical print head, incorporating a laser source and associated optical components, that is not susceptible to misalignment due to thermal expansion of components or shrinkage in bonding adhesives.

SUMMARY OF THE INVENTION

The invention provides a laser print head structure that includes a laser source, preferably a laser diode array, coupled to a heat sink. A lens element is aligned with the laser diode array and bonded to the heat sink. A binary optical element is then aligned with the lens element and attached to the heat sink through the use of flexures. The use of the flexures permits the binary optical element to "float" in the plane of the laser diode array, thereby maintaining alignment even when the thermal expansion characteristics of the binary optical element are different from the thermal expansion characteristics of the heat sink.

The lens element is preferably bonded to the heat sink through the use of an adhesive. A further aspect of the invention provides anti-wicking voids or slots in the heat sink at locations between the bonding points of the lens element and the laser diode array. The anti-wicking slots, through capillary action, prevent excess adhesive from wicking along the lens element and onto the laser source. The adhesive used to bond the lens element to the heat sink exhibits no measurable shrinkage, thereby preventing alignment problems due to adhesive shrinkage from occurring.

A still further aspect of the invention provides openings in the flexures to permit light to pass through the flexures to a light setting resin, such as an ultraviolet curable epoxy, that is used to bond the flexures to the heat sink.

BRIEF DESCRIPTION OF THE DRAWINGS

The invention will be described in greater detail with reference to the accompanying drawings, wherein:

FIG. 1 is a perspective exploded view of a laser diode array print head in accordance with the invention;

FIG. 2 is a top view of the laser diode array print head illustrated in FIG. 1 when assembled; and FIG. 3 is a side view of the laser diode array print head illustrated in FIG. 2.

DETAILED DESCRIPTION OF PREFERRED EMBODIMENTS

A laser print head in accordance with the invention is illustrated in FIG. 1. The print head includes a heat sink 10 having a recessed portion 12 into which a laser source, preferably a laser diode array 14, is fitted and secured. A front face 16 of the heat sink 10 includes at least two anti-wicking voids or slots 18 formed at locations between bonding points (B1) for a lens element 20, preferably a cylindrical lens having a diameter of 140–170 microns, and the recessed portion 12. A binary optic array 22 consisting, for example, of a surface relief lens array on a one to two millimeter thick glass or quartz substrate, is aligned with the cylindrical lens 20 and attached to the heat sink 10 through the use of flexures 24. The flexures 24 are preferably manufactured from copper, nickel, steel or other suitable metals. Nickel flexures, for example, having a thickness between 12.5–75 microns have been found to be suitable. Other materials may also be utilized, however, as long as they exhibit a high degree of dimensional stability when exposed to a wide range of environmental conditions.

The cylindrical lens 20 is attached to the heat sink 10 using an adhesive the preferably exhibits less than one percent shrinkage when hardened or cured. It is important to utilize a low shrinkage adhesive, as the alignment of the cylindrical lens 20 to the laser array 14 must be maintained to tolerances on the order of tenths of a micron. The cylindrical lens 20, for example, is positioned approximately 25 microns in front of the laser diode array 14, which in turn may be only 1 cm in length. Shrinkage in the adhesive bonding the cylindrical lens 20 to the heat sink 10 can easily cause incorrect alignment. It has been found that an adhesive such as EMCAST 1722, available from Electronic Materials Inc. of New Milford, Conn., exhibits substantially no measurable shrinkage, and is therefore ideal for use in bonding the cylindrical lens 20 to the heat sink 10. EMCAST 1722 also does not out gas after curing, which is also desirable when manufacturing optical elements which will eventually be placed in a sealed environment.

The provision of the anti-wicking slots 18 in the heat sink 10 at locations between the bonding points (B1) of the cylindrical lens 20 and the laser diode array 14 prevents excess adhesive from wicking along the cylindrical lens 20 and onto the facets of the lasers in the laser diode array 14. The anti-wicking slots 18 work through capillary action to draw away any excess adhesive and (although they are shown as slots cutting through the entire front face 16 of the heat sink 10 in the illustrated embodiment) can take any desired mechanical form, as long as they provide sufficient volume to draw off the excess adhesive.

In a preferred embodiment, an optical fiber is used for the cylindrical lens 20. The optical fiber, however, is quite flexible and must be kept straight to required tolerances. In order to keep the optical fiber straight, the bonding of the cylindrical lens 20 to the heat sink 10 is preferably performed at a temperature that is lower than the operating temperature of the print head. As the optical fiber has a thermal coefficient of expansion that is less than the thermal coefficient of expansion of the heat sink, the heat sink 10 expands at a faster rate as the assembly heats up and therefore applies tension to the cylindrical lens 20 to preventing it from sagging or bending.

As shown more clearly in FIG. 2, the flexures 24 are attached to the side of the binary optic array 22 and to the heat sink 10. If necessary, spacers 26 can be added as shown in FIG. 2 to match the length of the binary optic array 22 to the length of the front face 16 of the heat sink 10. It is preferable, however, that binary optic array 22 be manufactured to the same length as the front face of the heat sink 10, so that the flexures 24 can be directly bonded to the sides of the binary optic array 22 with an adhesive. During the manufacturing process, the flexures 24 are bonded to the binary optic array 22 to form a sub-assembly. The binary optic array 22 with the attached flexures 24 is then bonded to the heat sink 10.

A room temperature curable adhesive is preferably used to bond the flexures 24 to the heat sink 10, in order to avoid heating the structure to temperatures which might cause the cylindrical lens 20 to move or become unattached. Adhesives that cure at room temperature with short cure times, however, generally have a short pot life, which does not always give sufficient time to properly align the binary optic array 22. Room temperature curing adhesives having longer pot lifes are available, but usually take several hours to cure. While this is acceptable when manufacturing a small number of devices, the long cure time is a disadvantage when attempting to mass produce print heads.

A light setting resin, such as an ultraviolet curable epoxy, can be used to instantly bond the flexures 24 to the heat sink 10 once alignment is accomplished. In such a case, however, the flexures must be made from a material transparent to UV radiation. Metal flexures 24 cannot be bonded with a UV curable epoxy, as the opaque metal flexures would block the UV radiation. This problem can be overcome by providing holes 28 in the opaque flexures 24, as shown in the side view illustrated in FIG. 3, to allow ultraviolet light to pass through to an underlying ultraviolet curable epoxy, such as the EMCAST 1722 used to bond the cylindrical lens 20 to the heat sink 10. The holes 28 can be placed in the flexures 24 via laser, chemical or electric discharge etching. Electroforming can also be used to fabricate the flexures 24 with the holes 28 in them. An open area of 50% of the total area overlying the bonding point can be created without significantly reducing the strength of the flexures 24.

The heat sink 10 is preferably composed of copper which has a thermal expansion coefficient of $16.5\times10^{-6}/°$ C. The binary optic array 14, however, is made of quartz which has a thermal expansion coefficient of $0.47\times10^{-6}/°$ C. If the binary optic array 14 were directly attached to the heat sink 10, the differences in the thermal expansion between the two would create sufficient stress to cause a failure of an adhesive bond. The flexures 24, however, permit the binary optic array 14 to "float" in front of the heat sink 10, in the horizontal plane of the binary optic array 14, and the differences in the thermal expansion between the binary optic array 14 and the heat sink 10 are absorbed by the flexing of the flexures 24. It should also be noted that any shrinkage in the adhesive used to bond the flexures 24 to the heat sink 10 and the binary optic array 22 would also be along an axis that would be absorbed by the flexures 24. Thus, a low shrinkage adhesive is not required to bond the flexures 24 to the heat sink 10.

The invention has been described with reference to certain preferred embodiments thereof. It will be understood, however, that modifications and variations are possible within the scope of the appended claims. For example, the invention is applicable to print heads using a single discrete laser source instead of a laser diode array, and can be utilized to align any type of optical element. Thus, the invention is not limited to the use of a cylindrical lens or a binary optical array as specifically shown in the illustrated embodiments, but other elements, such as a virtual point source lens, could also be utilized. Further, the flexures 24 could also be attached to the heat sink 10 using a method other than adhesive bonding (soldering for example), or the adhesive may be applied along the edges of the flexures 24 instead of between the flexures and the heat sink 10 to permit a light setting resin to be used without the holes 28.

Industrial Utility

The invention is utilized in the manufacture of optical print heads. The invention, however, can be utilized in any application wherein the alignment of two components having mismatched thermal coefficients of expansion must be maintained or where adhesive shrinkage will impact the alignment.

What is claimed is:

1. An optical print head comprising: a heat sink; a laser source coupled to the heat sink; and a primary lens element coupled to the heat sink by flexures; wherein the primary lens element is optically aligned with the laser source; and wherein the flexures are bonded to the heat sink with an adhesive.

2. An optical print head as claimed in claim 1, further comprising a secondary lens element bonded to a face of the heat sink at first and second bonding points with another adhesive, wherein the laser source is located between the first and second bonding points and the secondary lens element is located between the laser source and the primary lens element.

3. An optical print head as claimed in claim 2, wherein the other adhesive exhibits less than one percent shrinkage.

4. An optical print head as claimed in claim 3, wherein the heat sink further includes first and second anti-wicking voids formed on the face of the heat sink and respectively located between the first and second bonding points and the laser source.

5. An optical print head as claimed in claim 1, wherein the adhesive is a light setting resin.

6. An optical print head as claimed in claim 5, wherein the flexures include means for permitting light to pass through to the light setting resin.

7. An optical print head comprising: a heat sink; a laser source coupled to the heat sink; and an optical element bonded to a face of the heat sink at first and second bonding points by an adhesive that exhibits less than one percent shrinkage; wherein the optical element is optically aligned with the laser source; and wherein the heat sink further includes first and second anti-wicking voids formed on the face of the heat sink and respectively located between the first and second bonding points and the laser source.

8. An optical print head as claimed in claim 7, further comprising a second optical element coupled to the heat sink by flexures; wherein the second optical element is optically aligned with the laser source.

9. An optical print head as claimed in claim 8, wherein the flexures are bonded to the heat sink with another adhesive.

* * * * *